(12) United States Patent
Shaver et al.

(10) Patent No.: US 9,450,696 B2
(45) Date of Patent: Sep. 20, 2016

(54) PHOTONIC COMPRESSIVE SENSING RECEIVER

(75) Inventors: Jesse Shaver, Cary, NC (US); Todd Nichols, Cary, NC (US)

(73) Assignee: Vadum, Inc., Raleigh, NC (US)

( * ) Notice: Subject to any disclaimer, the term of this patent is extended or adjusted under 35 U.S.C. 154(b) by 826 days.

(21) Appl. No.: 13/478,255

(22) Filed: May 23, 2012

(65) Prior Publication Data

US 2013/0315597 A1    Nov. 28, 2013

(51) Int. Cl.
*H04J 14/02* (2006.01)
*H04B 10/67* (2013.01)
*H04B 10/69* (2013.01)

(52) U.S. Cl.
CPC ............. *H04J 14/02* (2013.01); *H04B 10/67* (2013.01); *H04B 10/69* (2013.01); *H04J 14/0227* (2013.01); *H04J 14/0282* (2013.01); *H04J 14/0298* (2013.01)

(58) Field of Classification Search
USPC .......................................................... 398/79
See application file for complete search history.

(56) References Cited

U.S. PATENT DOCUMENTS

| | | | | |
|---|---|---|---|---|
| 5,796,774 A * | 8/1998 | Kato | ............... | H04B 1/707 375/146 |
| 5,983,113 A * | 11/1999 | Asanuma | ............. | H04B 1/7103 375/E1.024 |
| 6,882,834 B1 * | 4/2005 | Balboni | .............. | H04B 1/30 455/209 |
| 7,295,601 B1 * | 11/2007 | Sinha | ............... | H04L 7/042 370/395.62 |
| 7,388,899 B2 * | 6/2008 | Yamaguchi | ........ | H04B 1/71632 375/130 |
| 8,032,085 B2 * | 10/2011 | Mishali | .............. | H04B 1/667 370/203 |
| 8,219,360 B2 * | 7/2012 | Boufounos | ........... | H03M 7/30 702/189 |
| 2002/0182344 A1 * | 12/2002 | Merdan | ............... | C23C 14/048 427/596 |
| 2004/0022547 A1 * | 2/2004 | Szafraniec | ............ | H04B 10/64 398/204 |
| 2006/0165139 A1 * | 7/2006 | Sanchez | ............. | H01S 5/06832 372/29.021 |
| 2009/0008536 A1 * | 1/2009 | Hartog | ............... | G01J 3/4412 250/227.14 |
| 2009/0194699 A1 * | 8/2009 | Smitt | ............... | G01J 3/02 250/339.12 |
| 2009/0208200 A1 * | 8/2009 | Takasaka | ............. | G02F 2/002 398/1 |
| 2010/0280717 A1 * | 11/2010 | Schoos | .............. | B60R 21/01532 701/45 |
| 2012/0026578 A1 * | 2/2012 | Sakuma | .............. | G02F 1/3534 359/328 |
| 2012/0163813 A1 * | 6/2012 | Grosso | .............. | H04J 14/0226 398/49 |
| 2012/0203810 A1 * | 8/2012 | Ashikhmin | ....... | H04L 25/03343 708/203 |
| 2012/0213521 A1 * | 8/2012 | Zhang | ............... | H04J 14/02 398/79 |
| 2013/0315597 A1 * | 11/2013 | Shaver | .............. | H04J 14/0227 398/79 |

OTHER PUBLICATIONS

Nan et al.; optical to Analog-to- digital conversion system based on compressive sampling; Jan. 15, 2011, IEEE photonics technology letters vol. 23, No. 2, pp. 67-69.*
Dickson et al.; An 80-Gb/s 2-1 Pseudorandom Binary Sequence Generator in SiGe BiCMOS technology; Dec. 2005; IEEE journal of solid state circuits vol. 40, No. 12, pp. 2735-2745.*

(Continued)

*Primary Examiner* — Ken N Vanderpuye
*Assistant Examiner* — Amritbir Sandhu
(74) *Attorney, Agent, or Firm* — Murphy, Bilak & Homiller, PLLC

(57) ABSTRACT

A photonic implementation of the modulated wideband converter (MWC) is described. The highly scalable compressive sensing receiver architecture uses photonic components for analog front-end compression and downconversion, allowing scalable data conversion over an extremely wide instantaneous surveillance bandwidth, limited only by the peak anticipated signal occupancy and application-dependent size, weight, and power constraints.

10 Claims, 6 Drawing Sheets

(56) References Cited

OTHER PUBLICATIONS

Mishali, M. et al. "Xampling: Analog to Digital at Sub-Nyquist Rates." Technion—Israel Institute of Technology, Department of Electrical Engineering, CCIT Report No. 751, EE Pub No. 1708, Dec. 10, 2009.

Mishali, M. et al. "Xampling: Analog Data Compression." Data Compression Conference, Mar. 24-26, 2010, pp. 366-375.

Mishali, M. et al. "From Theory to Practice: Sub-Nyquist Sampling of Sparse Wideband Analog Signals." IEEE Journal of Selected Topics in Signal Processing, vol. 4, No. 2, Apr. 2010.

Mishali, M. et al. "Xampling: Signal Acquisition and Processing in Union of Subspaces." IEEE Transactions on Signal Processing, vol. 59, No. 10, Oct. 2011.

Nan, H. et al. "Optical Analog-to-Digital Conversion System Based on Compressive Sampling." IEEE Photonics Technology Letters, vol. 23, No. 2, Jan. 15, 2011.

\* cited by examiner

PHOTONIC COMPRESSIVE SENSING RECEIVER

BACKGROUND

The present invention generally relates to signal processing techniques, and more particularly relates to receiver architectures for converting signals appearing across a wide observation bandwidth to sampled signals processed at a relatively low sampling rate.

Many signal formats and related protocols are used by communication systems and other radio-frequency (RF) and optical communication systems and devices. In some applications, such as electronics intelligence (ELINT) and signal intelligence (SIGINT) applications, simply determining or confirming the existence of signals is of value, although being able to measure, demodulate, and/or decode the signals is typically a goal.

However, in some of these applications the signals of interest might appear in any or several portions of a very wide band of frequencies. Further, the center frequencies of these signals are frequently unknown, and many of the signals may be obscured by noise. Accordingly, significant efforts have been directed to the design of receiver front ends having very wide "surveillance" bandwidths, i.e., receivers that are capable of continuous detection and observation of signals across a very wide spectrum. Ideally, such a receiver front end can simultaneously acquire several signals of various bandwidths across a very wide frequency range, e.g., tens of gigahertz (GHz), and convert those signals to digitally sampled signals that can be processed at relatively moderate rates, e.g., at tens or hundreds of megahertz (MHz), without adding undue noise and interference to the signals.

For very wideband applications, sampling at the Nyquist rate (twice the total signal bandwidth) can be impractical or impossible. Several sub-Nyquist sampling schemes have been developed, including non-uniform sampling techniques. However, non-uniform sampling techniques have generally been limited in the types and number of signals that can be processed.

A technology referred to as Compressive Sensing (CS) has recently generated significant interest in the signal processing and information theory fields. One architecture in particular, called a "modulated wideband converter" (MWC), has demonstrated impressive sub-Nyquist performance, and is described in Mishali and Eldar, "From Theory to Practice: Sub-Nyquist Sampling of Sparse Wideband Analog Signals," IEEE Journal of Selected Topics in Signal Process, Vol. 4, No. 2, April 2010.

With the approach described by Mishali and Eldar, a very wide surveillance bandwidth is conceptually divided into several contiguous frequency bands. Fast pseudorandom sampling is then used to downconvert a wide spectral range to a much lower frequency and bandwidth, via aliasing. The known pseudorandom sampling waveforms generate "intelligent" aliasing of the contiguous frequency bands in the scanned spectrum. As a result, while these multiple contiguous frequency bands are downconverted so as to occupy a single, smaller bandwidth, it is still possible to distinguish between signals that originally occupied distinct frequencies in the surveillance bandwidth.

More particularly, the signals downconverted with the pseudorandom sampling waveforms are converted into high bit-depth digital samples, which are post-processed to reconstruct any relatively narrowband signals included in the original surveillance bandwidth. The resulting narrowband digital signals can be processed using conventional signal processing techniques to measure, demodulate, and/or decode the signals.

The compressive sensing techniques described by Mishali and Eldar suggest the possibility of major advances for wideband receivers. In particular, these techniques suggest that it may be possible to develop practically realizable receivers that persistently monitor extremely wide bandwidths (e.g., tens or hundreds of GHz) with high dynamic range. However, further improvements to these techniques are needed to make such receivers small, efficient, and cost-effective.

SUMMARY

Several embodiments of the present invention are based on a photonic compressive sensing receiver (PCSR) architecture that overcomes the bottleneck of electronic ADC performance. This architecture uses photonic components to achieve both sampling and compression, enabling relatively-few high bit-depth ADCs to efficiently cover a large surveillance bandwidth that is sparsely occupied with signals of interest at any given instant. The architecture is suitable for very high integration using photonic integrated circuit-based modules.

More particularly, embodiments of the present invention include a photonic implementation of the modulated wideband converter (MWC). The highly scalable PCSR architecture uses photonic components for analog front-end compression and downconversion. This architecture will allow scalable data conversion over an extremely wide instantaneous surveillance bandwidth, limited only by the peak anticipated signal occupancy and application-dependent size, weight, and power constraints.

An example embodiment of the PCSR includes a sampling-signal generator circuit configured to supply periodic spreading signals as modulation signals for modulating the outputs of corresponding optical sources. These optical sources are continuous-output sources, i.e., non-pulsed sources, and have distinct (i.e., separated) spectral outputs. In some embodiments the optical sources each comprise a continuous-output laser that is directly modulated by the periodic spreading signals via a laser driver circuit. In other systems, however, one or more of the optical sources may instead include a continuous-output laser or other light source with its output coupled to an electro-optical modulator, such as a Mach-Zehnder modulator, a ring resonator modulator, an electro-absorption modulator, or the like. In this case the modulation signal drives the electro-optical modulator rather than directly modulating the laser.

The outputs from the optical sources are thus spread source signals, with distinct central wavelengths and spread by generally uncorrelated periodic spreading signals. Suitable signals include, for example, pseudorandom binary sequences (PRBS) formed from Maximal Length Sequences or Gold codes. The spread source signals are combined, using an optical wavelength-division multiplexer (WDM), to produce a combined multi-spectral optical signal. This combined multi-spectral optical signal is supplied to an optical modulator, which is a Mach-Zehnder Modulator (MZM) in some embodiments. This optical modulator is also configured to receive a broadband, sparse, multiband input supplied by a broadband front-end system and broadband driver amplifier. The optical modulator mixes the broadband signal from driver amplifier with the combined, multi-spectral optical signal. The resulting modulated optical signal includes spectrally distinct components corresponding to each of the optical sources, each component including an instance of the broadband input signal as sampled by the corresponding PRBS. As suggested above, the spreading signals are not limited to PRBS sequences, and could include multi-level pseudo-random sequences (M-ary PRS), pseudo-random analog signals, or chaotic signals, for example.

The modulated optical signal from the optical modulator is then supplied to an optical wavelength-division demultiplexer, which is configured to separate the modulated optical signal into several optical output signals, each optical output signal corresponding to one of the distinct operating wavelengths of the optical sources. Each optical output signal is then supplied to a corresponding optical receiver branch, each branch including at least a photodetector receiver and an analog-to-digital converter (ADC). The digital output signals from the ADCs are supplied to a signal processing circuit, which can detect individual signals received by the broadband front-end system, characterize/classify the signals, and/or demodulate/decode them. In some cases, for example, the signal processing circuit is configured (e.g., with appropriate signal processing software) to recover estimates of one or more information signal streams carried by the broadband, sparse, multiband modulating signal, using a sparse signal reconstruction algorithm.

The individual sampling rates for the ADCs can be much lower than the Nyquist-criterion rate that would be necessary to directly digitize the broadband input signal from the driver amplifier. If the broadband input signal is fully occupied spectrally, then the aggregate sampling rate for ADCS must at least equal and perhaps exceed the Nyquist rate. However, in the (likely) event that the broadband input signal is less than fully occupied, the aggregate sampling rate need only exceed the Landau rate limit, the minimum sampling rate required by fundamental information theory considerations.

This property of the PCSR permits a dynamic scaling of the aggregate sampling rate, depending on how much of the surveillance bandwidth is occupied at any given time. With this dynamic scaling, individual receiver branches and their corresponding optical sources and PRBS sources can be activated and deactivated as needed. Accordingly, some embodiments of the PCSR further include a control processor configured to evaluate a frequency support structure of the broadband, sparse, multiband modulating signal, e.g., based on results from a sparse signal reconstruction algorithm. The control processor then selectively deactivates one or more of the continuous-output optical sources or activates one or more additional continuous-output optical source, based on said evaluation. The control processor can also deactivate or activate modulation signals corresponding to the selectively deactivated or activated continuous-output optical sources, respectively. Likewise, the control processor can deactivate or activate the optical receiver branch corresponding to the selectively deactivated or activated continuous-output optical source, respectively. Because high-speed PRBS generators and/or their associated driver circuits are relatively power-hungry devices, the power savings by deactivating those circuits, in particular, can be very significant.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
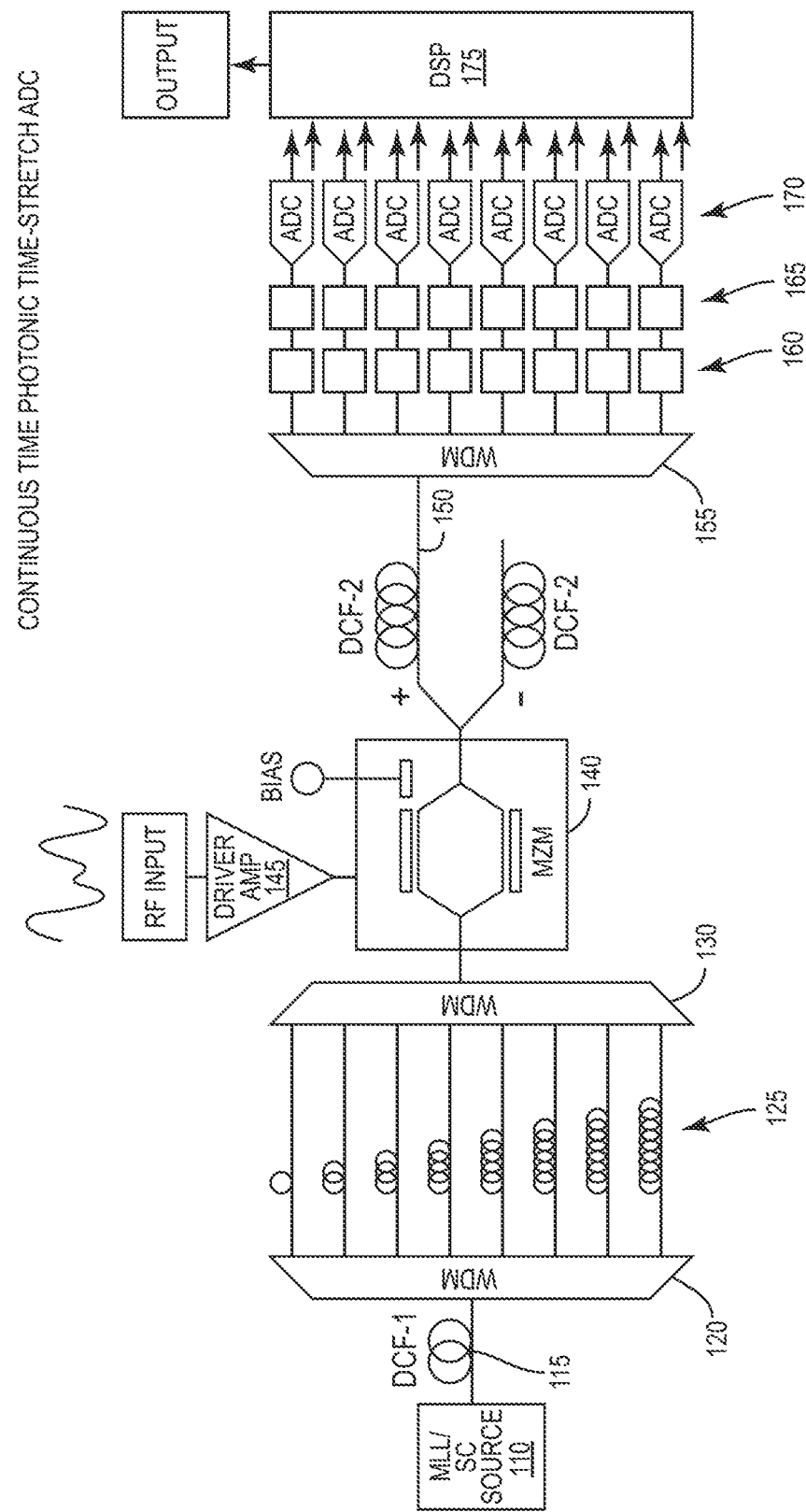
FIG. 1 is a block diagram illustrating a photonic time-stretch ADC.

The invention is described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

Wideband analog-to-digital conversion (at high bit-depth) has become a technological bottleneck for communication systems and advanced defense systems, including surveillance, intelligence, and reconnaissance, and communications systems. The advantages of digital copying, processing, analysis, and storage are well established.

However, many important sources of information are fundamentally analog in nature, necessitating at least one analog-to-digital conversion operation before the benefits of digital information manipulation may be realized. Depending on the application, an analog-to-digital converter (ADC) may require high instantaneous input bandwidth, high analog input signal frequency, high linear dynamic range, high sensitivity, and low power consumption. Improvements in electronic ADC device performance have occurred at a slower pace than improvements in digital processing and storage technology.

As the need for higher conversion rates and greater bit-depths becomes a priority, physical and technological performance limitations of basic electronic components become significant. Conventional electronic ADCs are limited by sampling clock jitter, sample-and-hold circuit settling times, comparator ambiguity and finite switching times, and thermal noise. Sampling jitter and comparator ambiguity chiefly limit sampling rates, while sample-and-hold circuit settling times limit analog RF input bandwidth. Thermal noise is most problematic in high bit-depth electronic ADC devices.

In order to achieve improved analog-to-digital converter performance, three basic strategies have historically been pursued, often in concert. The first is to use parallelized device architectures within the ADC itself. The second is to parallelize the entire system architectures into which the ADCs will be incorporated. The third is to substitute alternative device technologies with superior physical capabilities compared to conventional electronic ADCs. In principle, all three strategies could be used in a single system, particularly if SWaP and cost are not limiting factors.

Parallelized (interleaved, multiplexed) electronic ADC device architectures enable multiple low-rate converters to cover wider bandwidths. Eventually, electronic clock jitter, clock distribution, comparator ambiguity, and sampling device physics limit conventional electronic ADC performance.

In certain applications, entirely parallel system architectures have been adopted. For example, wide bandwidth channelized radio frequency (RF) receivers require a high-performance wideband front-end (antenna, low-noise amplifier, etc.), a filter bank, and several well-isolated signal demodulation chains comprising local oscillators, mixers, and ADCs. These channelized architectures are difficult to implement at low cost and in small footprints, however, and as the need for ultra-wideband coverage increases, scaling becomes even more problematic. Whole-system parallelization eventually becomes untenable over wide input bandwidths.

The new photonic compressive sensing receiver (PCSR) architecture described below overcomes the bottleneck of electronic ADC performance. This architecture uses photonic components to achieve both sampling and compression, enabling relatively-few high bit-depth ADCs to efficiently cover a large surveillance bandwidth that is sparsely occupied with signals of interest at any given instant. The architecture is suitable for very high integration using photonic integrated circuit-based modules.

Several novel device technologies have been employed in advanced ADC systems to overcome fundamental physical constraints and current technical limitations of conventional electronic ADCs. For instance, superconducting ADCs have been investigated as an alternative to conventional electronics. Superconducting ADC's use quantization of magnetic flux and ultrafast Josephson junction comparators integrated with more conventional back-end digital circuitry. Instantaneous input bandwidth of superconducting ADCs is projected at tens of GHz. At this time, the need for cryogenic support systems has limited commercial application of SADC technology.

Photonic components have also been used to build several different types of novel ADCs. Photonic components offer ultra-wideband performance and isolation from other system elements. For example, mode-locked lasers (MLLs) can be used as ultra-low jitter clocks (with jitters on the order of a few femtoseconds or less, compared to about 250 femtoseconds for a good electronic clock). Photonic ADCs can leverage the substantial prior investments that have been made to develop and produce robust, practical components for commercial communications applications, such as modulators and wavelength division multiplexers (WDMs).

One class of photonic ADC is the interleaved optical sampling converter. In this approach, a high-rate stream of low-jitter pulses (or a chirped pulse stream) is used to sample an analog signal. Time-division multiplexing (or wavelength-division multiplexing) then routes subsamples of the sampling pulse stream to a parallel group of photoreceivers and ADCs. Such converters particularly benefit from the ultra-low time-domain jitter of certain laser sources to sample the input.

Optical dispersion effects may also be used in photonic ADC systems. In the photonic Time-Stretch ADC (TS-ADC), for example, a linearly-chirped optical pulse is modulated with an input signal using an electro-optical Mach-Zehnder modulator (MZM), and then temporally stretched via further dispersion in a high-dispersion fiber or chirped-fiber Bragg grating. This stretched pulse can then be converted back to the analog electronic domain and digitized with a lower-rate ADC. Due to the discontinuous (piecewise) nature of the time stretch system, a parallelized implementation with several electronic ADCs (scaled in proportion to the stretch factor plus an overlap margin) is needed for continuous digitization. This parallelization can be achieved via time-division or wavelength-division multiplexing.

FIG. 1 is a block diagram of a photonic TS-ADC that uses a high-dispersion fiber for optical pulse stretching and wavelength-division multiplexing for parallelization. An optical signal is produced by mode-locked laser (MLL)/supercontinuum (SC) source 110, which produces a very low-jitter, spectrally-broad ultra-short pulse train. This output pulse train is passed through a length of dispersion-compensating fiber (DCF) 115, which stretches the output of the MLL/SC source 110 to produce a continuous-spectrum, linearly chirped pulse with a stretched duration that slightly exceeds the pulse train repetition interval. DCF 115, which may be several kilometers long, feeds a wavelength-division multiplexer (WDM) 120, which divides the optical signal into several spectrally distinct bands. The WDM passbands may create both temporal and spectral discontinuities between the divided optical signals, which are passed through fibers 125 of different lengths to produce different delays that restore temporal continuity. The outputs from fibers 125 are then combined, using WDM 130, to produce a combined optical signal with spectral discontinuities but with the temporal discontinuities eliminated.

The output from WDM 130 drives an electro-optical Mach-Zehnder Modulator (MZM) 140, which modulates the optical signal with a broadband radio-frequency (RF) signal produced by RF driver amplifier 145. The modulated output from MZM 140 is then passed through a very long DCF 150, which provides temporal pulse stretching. DCF 150 may be 100 kilometers or more in length; as a result, erbium-doped fiber amplifiers (EDFAs) may be needed to maintain the pulse. The output of DCF 150 is passed through WDM 155, which divides the modulated signal into time-stretched passband segments. After detection by photoreceivers 160 and filtering by low-pass filters 165, the time-stretched passband segments are digitized, using electronic ADCs 170. This digitization is performed at a fixed aggregate rate (i.e., the sum of the sampling rates) that is proportional to the RF input bandwidth, i.e., so as to satisfy the Nyquist criterion. The digitized samples are then processed by digital signal processor 175, for detection, classification, demodulation, etc.

However, dispersive photonic time stretching has distortion penalties. High-frequency components of the input analog waveform are differentially attenuated by dispersive elements, creating distortion. MZMs and WDM filters also have wavelength-dependent group delay variation, causing distortion in the wavelength-to-time mapping. Optical nonlinearity arising from Kerr-effect self-phase modulation can also occur, due to high peak optical power in the initial linear dispersion stage fiber, further distorting the wavelength-time mapping relationship. In addition to Kerr nonlinearity, other optical sources of nonlinearity including four-wave mixing, stimulated Brillouin scattering, and stimulated Raman scattering. Upper and lower optical sidebands travel at different group velocities in the dispersive media, leading to frequency-dependent destructive interference at the output photodetector. The dispersion penalty becomes very significant for ultra-wideband TS-ADC systems operating above 20 GHz input bandwidth.

The systems described briefly above demonstrate the potential capabilities of advanced component device technology (superconducting and photonic), including instantaneous input bandwidth, low jitter, and reliable multiplexing and de-multiplexing. Photonic device technologies allow conventional electronic ADCs to accept ultra-wideband analog inputs and digitize them in parallel. Prototypes of photonic ADC systems have already exceeded the best-known electronic ADCs in high-rate, high-bit-depth performance.

Photonic parallelized ADC systems compare favorably to some parallelized system architectures (such as ultra-wideband channelized receivers) in terms of practical scalability and ultimate achievable performance. However, these systems still require a total system ADC conversion throughput that is scaled according to the surveillance bandwidth, with additional margins to provide overlap and to compensate for distortion. For the vast majority of real-world ultra-wideband applications, the array of parallel ADCs will produce a massive sequence of bits that carry relatively little useful information, necessitating additional wasteful input-output (I/O) and processor resources to compress and discard the converter's mostly "empty" output stream.

Many important classes of signals exist in a widely-bounded yet sparsely-occupied spectrum. Indeed, it is precisely sparseness that defines the problem of wireless signal interception. The signal to be intercepted is "hidden" within a large swath of mostly-empty spectrum, with energy distributed among a set of carriers often known only to the transmitter and intended receiver. A conventional interception receiver must monitor a wide (but mostly empty) surveillance bandwidth continuously to assure a high probability of intercept of signals that may appear at any time, with any modulation type and at any carrier frequency. The information content of signals of interest is orders of magnitude lower than the instantaneous capacity of the vast electromagnetic spectrum in which they reside.

The standard paradigm in most data acquisition and processing systems is to first convert band-limited analog information to digital information by sampling at a sufficiently-high uniform rate (according to the Nyquist-Shannon criterion), and then to compress the resulting samples in the digital domain. This approach essentially discards the vast majority of measured bits, i.e., those carrying little or no independent signal information. While proven and effective, the convert-then-compress paradigm is wasteful of limited ADC resources in any measurement of a sparse data set. High ADC rates create the secondary problem of increased demands on digital transmission and processing. In systems that require a rapid or real-time response, the voluminous stream of data must be handled by sufficiently fast processing to provide real-time or near real-time functionality.

As noted above, compressive sensing (CS) is an emerging body of research in signal processing and information theory. CS is based upon a reinterpretation of the Nyquist criterion as it applies to classes of signals that are sparse in some basis. Compressive sensing builds upon the idea that a sparse signal may be measured using a small set of linear non-adaptive measurements in such a manner that very few of the measured bits are uninformative, thereby utilizing ADC resources more efficiently. Provided that the signal is sparse in some basis or frame, the signal information can be recovered using far fewer measurements than the Nyquist-Shannon sampling requirements would conventionally dictate. The actual information content of the signal determines the minimum required sampling rate, rather than the dimensions of the ambient space in which the signal resides.

According to the Nyquist-Shannon sampling theorem, a band-limited analog signal can be reconstructed from equally-spaced samples if the sample rate exceeds twice the signal bandwidth. While this condition is sufficient, it is often not necessary. This is because many signals of interest are sparse (rather than band-limited) and can be adequately represented by a much smaller amount of information, using a multiband signal model.

In some applications, such as electronic warfare scenarios, the carrier frequencies of the signals of interest are unknown and the signals might be located anywhere within a broad spectrum. However, even in a relatively dense environment, typically only a small portion of the total spectrum above a few gigahertz is actually occupied by signals of interest at any given instant.

In compressive sensing, compression occurs before digitization, in a preprocessing stage. Signals can therefore be sampled at a rate proportional to their actual information content, rather than to the large bandwidth which the signals might (sparsely) occupy.

Compressive sensing technology enables a wideband converter architecture that measures/digitizes at a rate proportional to the occupied bandwidth, rather than the surveillance bandwidth. This potentially translates to large savings in system cost, size, power, and/or weight. Over extremely-wide surveillance bandwidths (40 GHz or more), parallelized systems (such as channelized receivers) do not scale well. Defense applications may require electronic warfare (EW) surveillance well beyond 100 GHz in the near future, mounted on small platforms with low system size, weight, and power.

Compressive sensing is sometimes confused with the unrelated yet similarly-named analog preprocessing technologies known as compressive receivers or microscan receivers. Compressive receivers rely on a fundamentally different approach (involving swept tuners and compressive filters) to obtain a spectral display of the full band over which the receiver is tuned. The compressive receiver has advantages for certain signal detection applications, but cannot demodulate signals, unlike a receiver based on compressive sensing technology, which preserves the information content of the received signals.

Several CS systems have been proposed by signal processing theorists. These proposed systems differ in their signal models, sensitivity to hardware non-ideality, and processing requirements. Some CS systems are better-able to reduce downstream processing and storage requirements, thereby reducing power, size, and cost of the system. Some proposed compressive sensing systems have already been demonstrated successfully in hardware implementations.

One important system to emerge in the CS literature is the modulated wideband converter (MWC), discussed briefly above. The MWC is the first hardware-proven architecture for blind multiband signal recovery with a required collective sampling rate directly proportional to the occupied bandwidth, rather than to the surveillance bandwidth.

Figure 2:
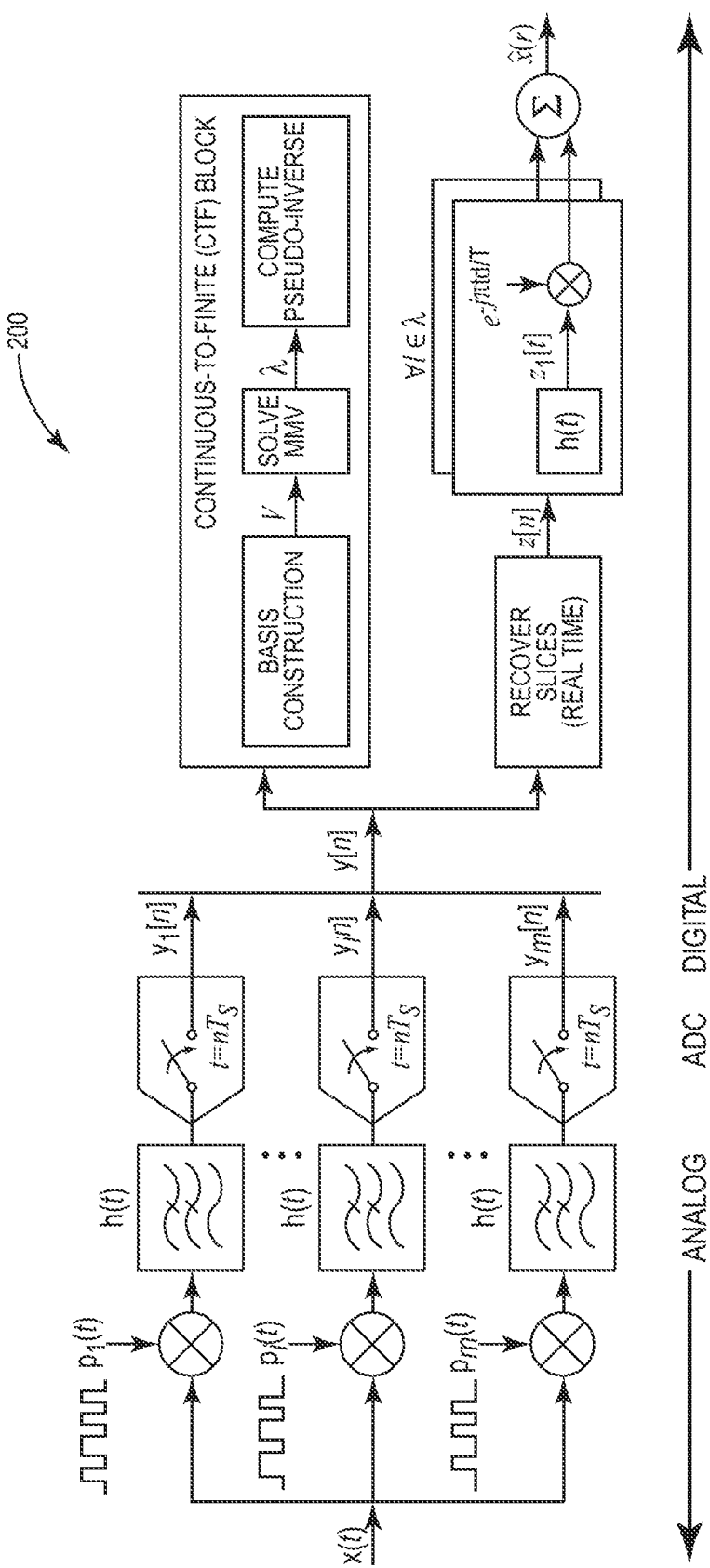
FIG. 2 is a schematic diagram illustrating the modulated wideband converter (MWC).

FIG. 2 illustrates the essential features of an example MWC 200. Signals of interest that occupy a portion of the surveillance bandwidth are sampled by pseudorandom functions to create a set of aliased baseband and band-limited copies. The incoming wide-bandwidth signal x(t) is mixed with m unique periodic sampling functions $p_i(t)$, lowpass-filtered, and sampled with m ADCs to obtain sample vectors y[n]. The follow-on digital signal processing extracts a matrix that is used in near-real-time to recover signals from the spectrum.

As can be seen in FIG. 2, MWC 200 uses an analog front end that mixes a wideband input signal with one or more wideband periodic waveforms made up of sign alternations with very high speed transitions. This mixing operation samples the entire surveillance bandwidth and shifts weighted-sum combinations of signal components down to low frequencies. After analog low-pass filtering, these down-converted signals are digitized using standard ADCs. The outputs are digitally processed to allow recovery of the carrier frequencies and signal reconstruction. The MWC allows for "blind" capture and reconstruction of signal information using only approximately twice the ADC throughput that would be required if the carrier frequencies for each signal were known a priori and the signals were therefore demodulated. The MWC allows for much lower aggregate ADC throughput than is required for a standard channelized approach, even without accounting for extra ADCs to provide channel overlap. While the MWC 200 illustrated in FIG. 2 uses wideband-periodic waveforms consisting of high-speed sign alternations for the spreading waveforms that are applied to the broadband input signal x(t), other modulating waveforms could be used, such as waveforms that transition between zero and one, or M-ary digital signals having more than two discrete amplitudes, or even various analog waveforms may be used.

Figure 3:
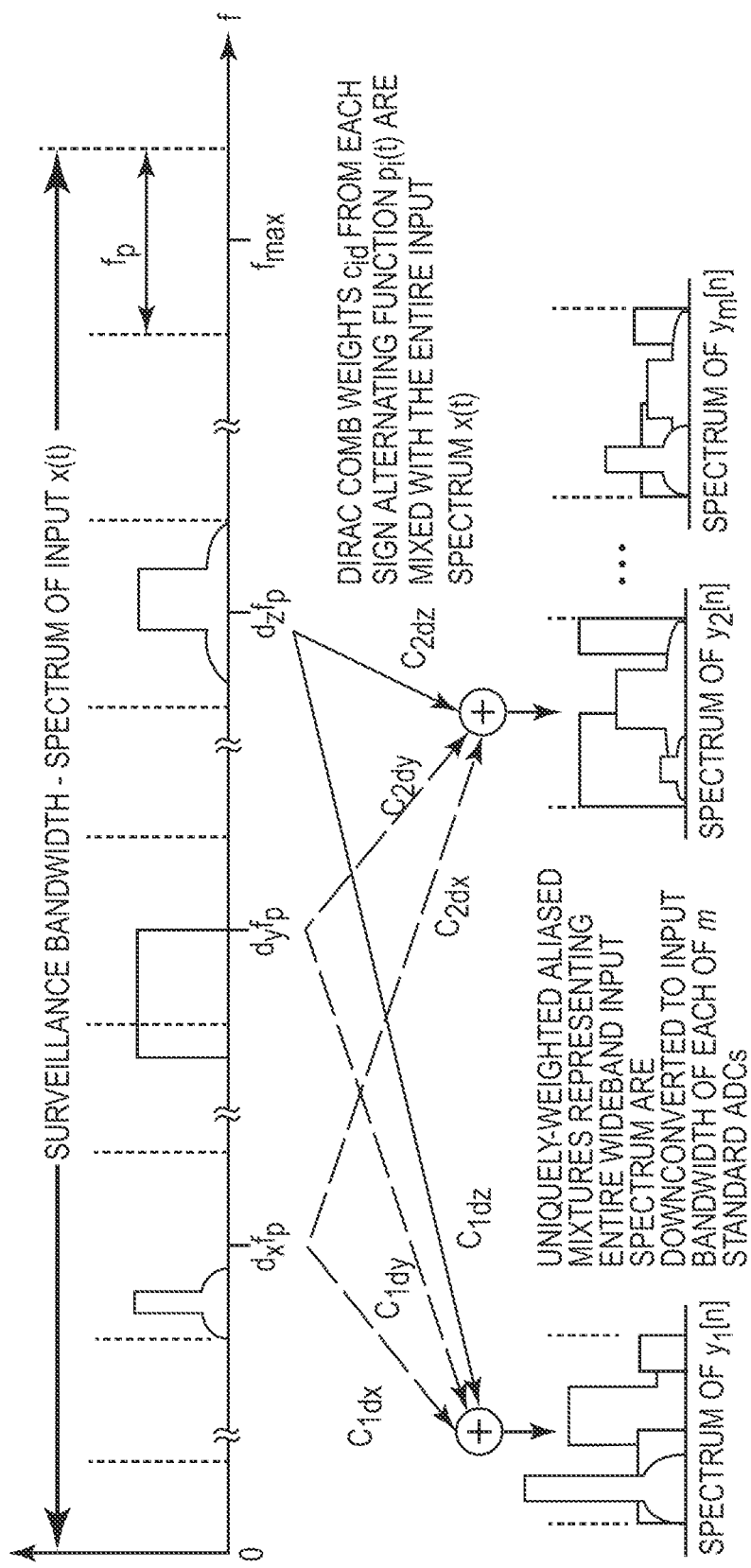
FIG. 3 illustrates the frequency-domain operations of the MWC.

In more detail, MWC 200 receives a multiband signal x(t) at its input, as shown at FIG. 2. The multiband signal x(t) has sparse spectra, supported on N frequency bands, which can be located anywhere in the surveillance bandwidth below $f_{max}$. An example distribution of occupied frequency bands in the surveillance bandwidth 0 to $f_{max}$ is shown in the upper portion of FIG. 3. The individual bandwidths of each band do not exceed $f_p$ Hz for a maximum occupied bandwidth of $Nf_p$ Hz. In general, the input x(t) passes through m high-bandwidth processing channels. In the i-th channel, x(t) is multiplied by a unique periodic waveform $p_i(t)$ having a period $T_p$. Each signal branch is then analog low-pass filtered according to a filter response h(t), with a cutoff frequency of ½ $T_s$, and then sampled at a rate of at least $f_s = 1/T_s$.

This version of the MWC implies basic parameters of m≥4N and $f_s = 1/T \geq B$. However, the MWC architecture also tolerates collapsing of the number of branches m by a factor q, at the expense of increasing the sampling rate of each channel by the same factor, such that $f_s = q/T$. In principle, the MWC can be collapsed to a single physical sampling branch by setting q=m. The choice of the number of processing branches must be made based on application-specific requirements, including the maximum expected occupied bandwidth over the entire spectrum of interest. The design trade-offs include the size, weight, power, cost, bit depth, and sampling rate of an individual ADC versus the size, weight, power, and cost of the analog hardware in each of m branches (including the PRBS generator, local oscillator drivers, mixers, detectors, and low-pass filters).

Since each $p_i(t)$ is periodic, it has a Fourier expansion that consists of a weighted Dirac comb with locations at d/T and weights $c_{id}$:

$$p_i(t) = \Sigma_{d=-\infty}^{\infty} c_{id} e^{j2\pi t d/T}.$$

The notation $z_d[n]$ can be used to denote the measured sequence obtained by mixing the signal with a pure sinusoid, $e^{j2\pi t d/T}$, and then low-pass filtering and sampling, such that $z_d[n]$ are samples of the content in a width-$f_p$ slice of spectrum around d/T Hz. These slices are shown in the upper portion of FIG. 3, where they are separated from one another by dashed lines. The input x(t) is determined by $z_d[n]$, $-L \leq d \leq L$, where L is the smallest index such that $Lf_p \geq f_{max}$. Together, M=2L+1 spectral slices cover the entire Nyquist spectral range of interest from $-f_{max}$ to $f_{max}$. Choosing $1/T \geq B$ ensures that a single signal band occupies at most two adjacent slices of spectrum.

The vector of downconverted samples $y[n]=[y1[n], \ldots, ym[n]]^T$ obtained at time d=nT satisfies the underdetermined system:

$$y[n]=Cz[n], \|z[n]\|_0 \leq 2N.$$

The sensing matrix C is an m×M matrix whose entries are $c_{id}$, and the vector $z[n]=[z_L[n], \ldots, z_L[n]]^T$. The modulated wideband converter shifts a weighted sum of the spectrum slices to the origin. The lowpass filters transfer only a narrow band of the frequencies from the weighted sum to the output sequence $y_i[n]$. The periodic functions $p_i(t)$ define the sensing matrix C. In principle, any periodic function with high-speed transitions can satisfy the requirement. Maximal and Gold sequences with M sign intervals within period T have been shown to be especially well-suited for the MWC.

In principle, it is possible to solve for the sparsest solution z[n] for every n, and then reconstruct the original x(t) by re-assembling the spectrum slices. A more efficient approach is the continuous-to-finite (CTF) approach as shown in FIG. 2, which uses a nonlinear computational block that exploits the fact that z[n] are jointly sparse over time, such that the index set $\lambda = \{d | z_d[n]\}$ is constant over consecutive time instances n. The CTF block performs coarse subspace detection by finding the input spectral support at the coarse resolution of active spectrum slices (slices that contain all or part of one or more active bands). The CTF block can be executed intermittently with a short buffering of samples to prevent data loss in the event that the support changes.

The CTF algorithm recovers λ by constructing a matrix V from several consecutive samples y[n], and then solving the system V=CU, $\|U\|_0 \leq 2N$. It has been shown that U has nonzero rows in locations that coincide with the indices in λ. Once the index set λ has been found, the pseudo-inverse of matrix $C_\lambda$ (a column subset of C identified by the indices) can be used to directly reconstruct signals at a computational cost of one matrix-vector multiplication per incoming sample vector.

The CTF block is the non-linear portion of the MWC reconstruction algorithm. The CTF operates on numerical structures which are orders of magnitude smaller in dimension than other compressive sensing architectures (such as the random demodulator). This results in increased processing throughput and reduced latency.

In several embodiments of the present invention, the MWC described above in general terms is implemented with a unique combination of electronic, photonic, and electro-optical components. This highly scalable photonic compressive sensing receiver (PCSR) architecture uses photonic components for analog front-end compression and down-conversion. This architecture will allow scalable data conversion over an extremely wide instantaneous surveillance bandwidth, limited only by the peak anticipated signal occupancy and application-dependent size, weight, and power constraints.

Figure 4:
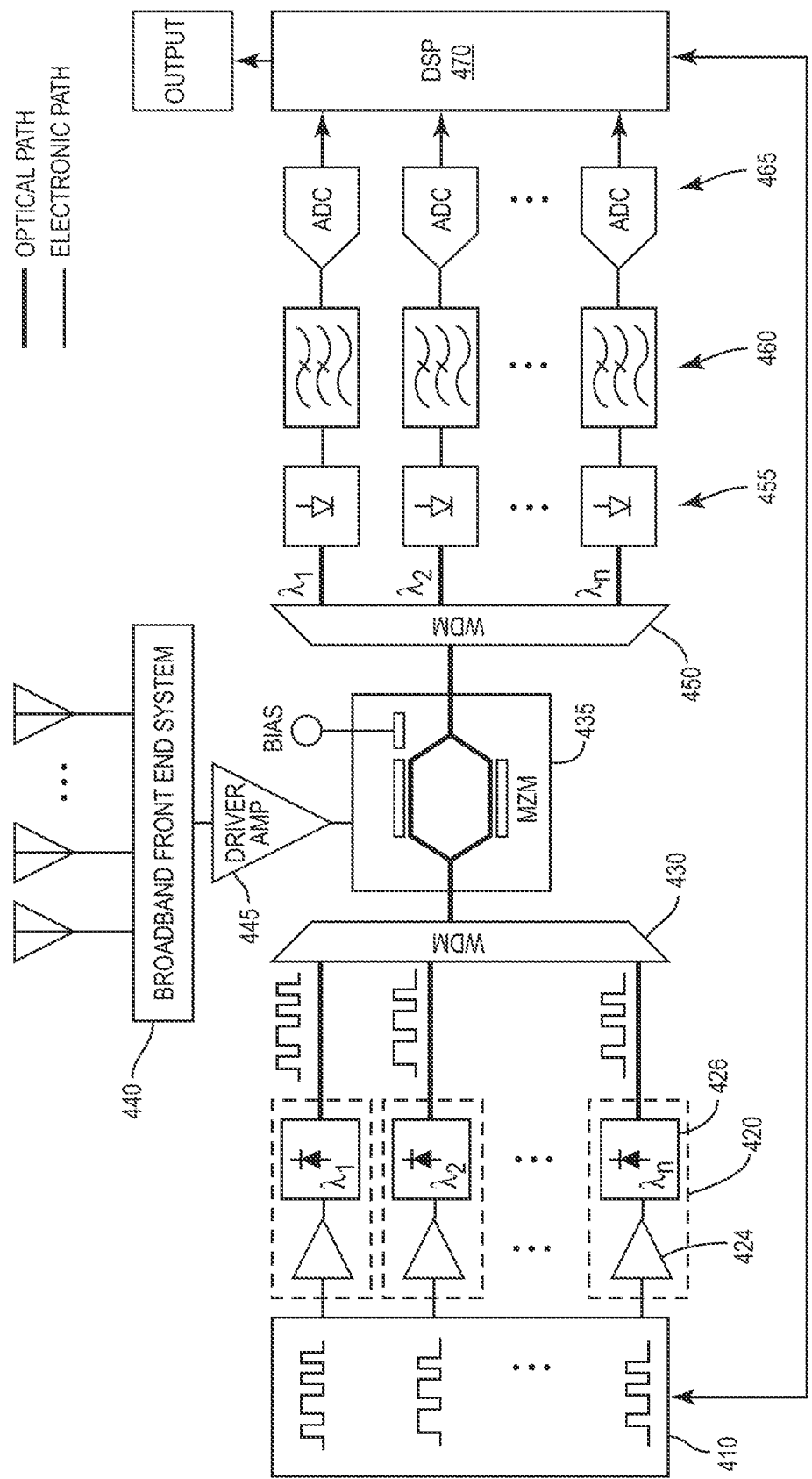
FIG. 4 is a block diagram illustrating one embodiment of the Photonic Compressive Sensing Receiver (PCSR).

FIG. 4 is a block diagram illustrating one such embodiment. The illustrated PCSR includes a sampling-signal generator circuit 410, which in the illustrated system is configured to supply several pseudorandom binary sequence (PRBS) modulation signals. However, it will be appreciated that other periodic spreading signals are possible, provided that they are of sufficient bandwidth and have known spectral distributions. Examples include multi-level pseudo-random sequences (M-ary PRS), pseudo-random analog signals, or chaotic signals. Sampling-signal generator circuit 410 may include separate PRBS sequence generators and corresponding output drivers, in some embodiments, or a single PRBS sequence generator with output drivers tied to multiple, sufficiently uncorrelated taps, or a combination of several multi-tap-output generator circuits.

The PRBS modulation signals produced by sampling-signal generator circuit 410 are used to modulate the outputs of corresponding optical sources 420. These optical sources 420 are continuous-output sources, i.e., non-pulsed sources, and have distinct (i.e., separated) spectral outputs from one another. In the example system pictured in FIG. 4, the optical sources 410 each comprise a continuous-output laser 426 that is directly modulated by the PRBS modulation signal via laser driver 424, which is connected to a biasing input of the directly-modulatable laser 426. In other systems, however, one or more of the optical sources may instead include a continuous-output laser or other light source, with its output coupled to an electro-optical modulator, such as a Mach-Zehnder modulator, a ring resonator modulator, an electro-absorption modulator, or the like, in which case the PRBS modulation signal drives the electro-optical modulator rather than directly modulating the laser.

The outputs from optical sources 410 are spread source signals, in this case PRBS-spread source signals, with distinct central wavelengths and spread by generally uncorrelated PRBS sequences (e.g., generated from Maximal-Length or Gold codes, as discussed above). These PRBS-spread source signals are combined, using optical wavelength-division multiplexer (WDM) 430, to produce a combined multi-spectral optical signal. This combined multi-spectral optical signal is supplied to an optical modulator 435, pictured in FIG. 4 as a Mach-Zehnder modulator. A Mach-Zehnder modulator implements amplitude modulation, though other forms of amplitude or quadrature modulation could also be used. In addition to its optical input, which is configured to receive the combined multi-spectral optical signal, optical modulator 435 also includes a modulation input configured to receive a broadband, sparse, multiband input supplied by broadband front-end system 440 and broadband driver amplifier 445. Optical modulator 435 mixes the broadband signal from driver amplifier 445 with the combined, multi-spectral optical signal. The resulting modulated optical signal includes spectrally distinct components corresponding to each of the optical sources 410, each component including an instance of the broadband input signal as sampled by the corresponding PRBS.

The modulated optical signal from optical modulator 435 is then supplied to an optical wavelength-division demultiplexer 450, which is nothing more than a wavelength-division multiplexer used in reverse. Wavelength-division demultiplexer 450 is configured to separate the modulated optical signal into several optical output signals, each optical output signal corresponding to one of the distinct operating wavelengths of the optical sources 410. Each optical output signal is then supplied to a corresponding optical receiver branch, each branch including a photodetector receiver 455 (which may be based on a photodiode, for example) and a low-pass filter 460, which may represent a distinct component or a low-pass response inherent to one or more other components in the receiver branch, or both. Finally, an analog-to-digital converter 465 in each branch digitizes the detected signal from the photodetector receiver 455. The digital output signals from ADCs 465 are supplied to signal processing circuit 470, which can detect individual signals received by the broadband front-end system 440, characterize/classify the signals, and/or demodulate/decode them. (In Electronic Warfare (EW) and Signal Intelligence (SIGINT) applications, these latter operations are often referred to as detection, classification, and recovery. Of course, the PCSR illustrated in FIG. 4 is not limited to EW and SIGINT uses.)

In some cases, for example, signal processing circuit 470 is configured (e.g., with appropriate signal processing software) to recover estimates of one or more information signal streams carried by the broadband, sparse, multiband modulating signal from broadband driver amplifier 445, using a sparse signal reconstruction algorithm.

As discussed above, the individual sampling rates for ADCs 465 can be much lower than the Nyquist-criterion rate that would be necessary to directly digitize the broadband input signal from driver amplifier 445. If the broadband input signal is fully occupied spectrally, then the aggregate sampling rate for ADCs 465 must at least equal the Nyquist rate. However, in the (likely) event that the broadband input signal is less than fully occupied, the aggregate sampling rate need only exceed the Landau rate limit, the minimum sampling rate required by fundamental information theory considerations.

This property of the PCSR permits a dynamic scaling of the aggregate sampling rate, depending on how much of the surveillance bandwidth is occupied at any given time. Thus, an important advantage of the MWC in general and of the PCSR in particular is that the number of active processing branches (PRBS generators, lasers, drivers/modulators, and ADCs) can be idled or throttled to save power according to input spectrum occupancy, while maintaining 100% probability-of-intercept surveillance. With this dynamic scaling, individual receiver branches and their corresponding optical sources and PRBS sources can be activated and deactivated as needed. Accordingly, some embodiments of the PCSR generally pictured in FIG. 4 include a control processor (which may be signal processing circuit 470 or another processing circuit) configured to evaluate a frequency support structure of the broadband, sparse, multiband modulating signal, e.g., based on results from a sparse signal reconstruction algorithm. The control processor then selectively deactivates one or more of the continuous-output optical sources or activates one or more additional continuous-output optical source, based on said evaluation. The control processor can also deactivate or activate modulation signals corresponding to the selectively deactivated or activated continuous-output optical sources, respectively. Likewise, the control processor can deactivate or activate the optical receiver branch corresponding to the selectively deactivated or activated continuous-output optical source, respectively. Because high-speed PRBS generators and/or their associated driver circuits are relatively power-hungry devices, the power saved by deactivating those circuits, in particular, can be very significant.

Figure 5:
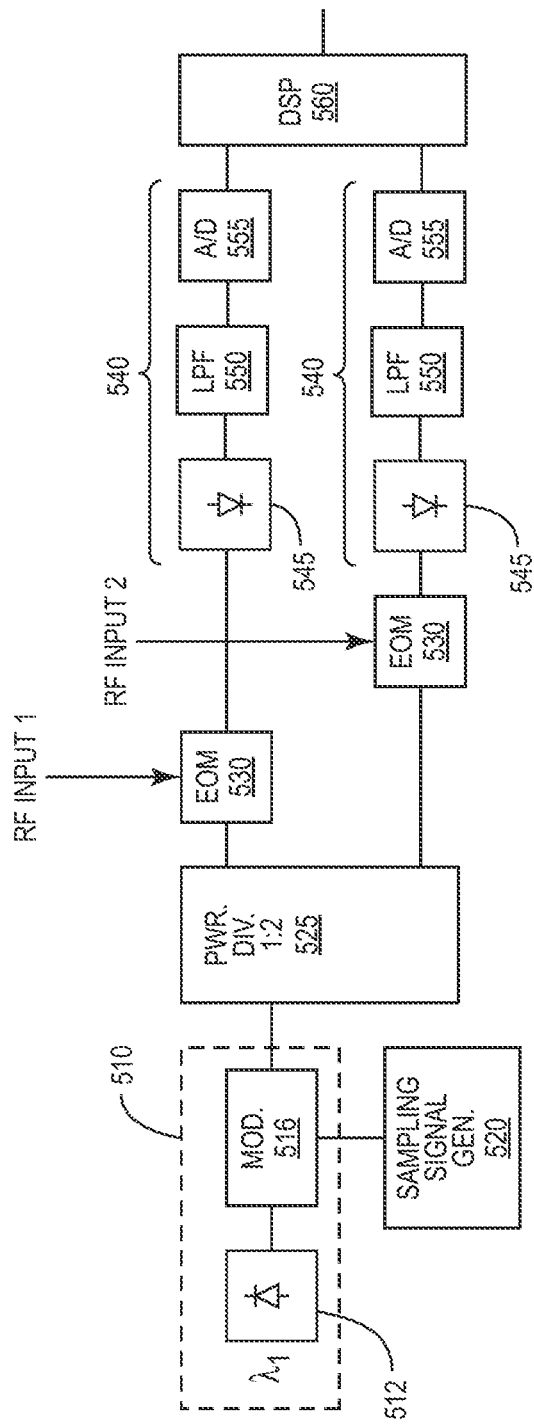
FIG. 5 illustrates a multi-broadband-input compressive sensing receiver.

The PCSR architecture detailed above exploits parallelism with its use of two or more PRBS-spread optical source signals, which each separately downconvert a single broadband input in a single electro-optical modulator. FIG. 5 illustrates a different approach to parallelism, based on the use of two (or more) modulators corresponding to two or more broadband signal inputs.

The compressive sensing receiver system pictured in FIG. 5 includes a modulatable signal source 510, with its modulation input driven by a sampling-signal generator circuit 520. Sampling-signal generator circuit 520 is configured to supply a periodic spreading signal to modulatable signal source 510. In several embodiments, this periodic spreading signal is a pseudorandom binary sequence, although it will be appreciated that the theory behind the MWC allows other periodic spreading signals to be used. It should also be noted that in FIG. 5, modulatable signal source 510 comprises a continuous-output laser diode 512 and an electro-optic modulator 516. A directly-modulated, continuous-output laser may be used instead. Indeed, as will discussed in further detail below, the techniques embodied in the system illustrated in FIG. 5 are not limited to implementation using photonics components. Accordingly, in some embodiments modulatable signal source 510 may comprise a modulatable RF or microwave oscillator circuit.

Referring once again to FIG. 5, the illustrated receiver further includes a power splitter 525 coupled to the first signal source output of the first modulatable signal source 510. Power splitter 525 splits the output signal from signal source 510 into two output signal portions, each having substantially the same spectral content. Although the system in FIG. 5 includes a two-way power splitter 525, it will be appreciated that the illustrated system may be extended to include three or more parallel branches, requiring a three-way or n-way power splitter. Also of note is that power splitter 525 may be a conventional optical power splitter in a photonics-based implementation, or an RF or microwave power splitter in a purely electrical system.

The heart of the compressive receiver illustrated in FIG. 5 is the parallel structure of two modulators 530 coupled to the outputs of power splitter 525. These modulators 530 each have a modulation input configured to receive a corresponding broadband, sparse, multiband modulating signal, and a corresponding modulator output configured to output a corresponding modulated multi-band signal. The broadband input signals are produced by an a analog front-end circuit (not show), which has two signal paths providing multiband modulating signals spanning a frequency bandwidth of no more than one-half of the sampling frequency. The broadband input signals correspond to completely distinct frequency bands in some cases. In others, the input signals may be in the same or overlapping bands. In other embodiments the overlapping bands could result when the input signals are taken from two separate antennas.

The outputs from modulators 530 are each processed by a corresponding receiver branch 540, which includes a signal detector 545, a low-pass, anti-aliasing filter 550, and an analog-to-digital converter 555. The digital outputs from ADC 555 are supplied to signal processing circuit 560, which can detect individual signals included in the broadband signal inputs, characterize/classify the signals, and/or demodulate/decode them. In some cases, for example, signal processing circuit 560 is configured (e.g., with appropriate signal processing software) to recover estimates of one or more information signal streams carried by the broadband, sparse, multiband modulating signals, using a sparse signal reconstruction algorithm.

As noted above, in the pictured embodiment of FIG. 5 the modulatable signal source 510 is a continuous-output optical signal source, such as a continuous wave laser with its output coupled to an electro-optical modulator. In other embodiments, however, the modulatable signal source may instead be a directly-modulated continuous-output laser, where the output from sampling-signal signal generator 520 is coupled to the laser's biasing input. In still other embodiments, the entire system is electrical, rather than based on photonics components, in which case photonic instances of modulatable signal source 510, power splitter 525, modulators 530, and signal detectors 545 are replaced with their electrical counterparts.

For the reasons discussed above in describing the MWC, the required collective sampling rate of a compressive receiver is directly proportional to the occupied bandwidth, rather than to the surveillance bandwidth. The system pictured in FIG. 5 has only a single downconverting signal source and two receiver branches. Accordingly, the sum of the sampling rates at ADCs 555 must be at least twice the sum of the occupied bandwidth in the two broadband input signals.

Figure 6:
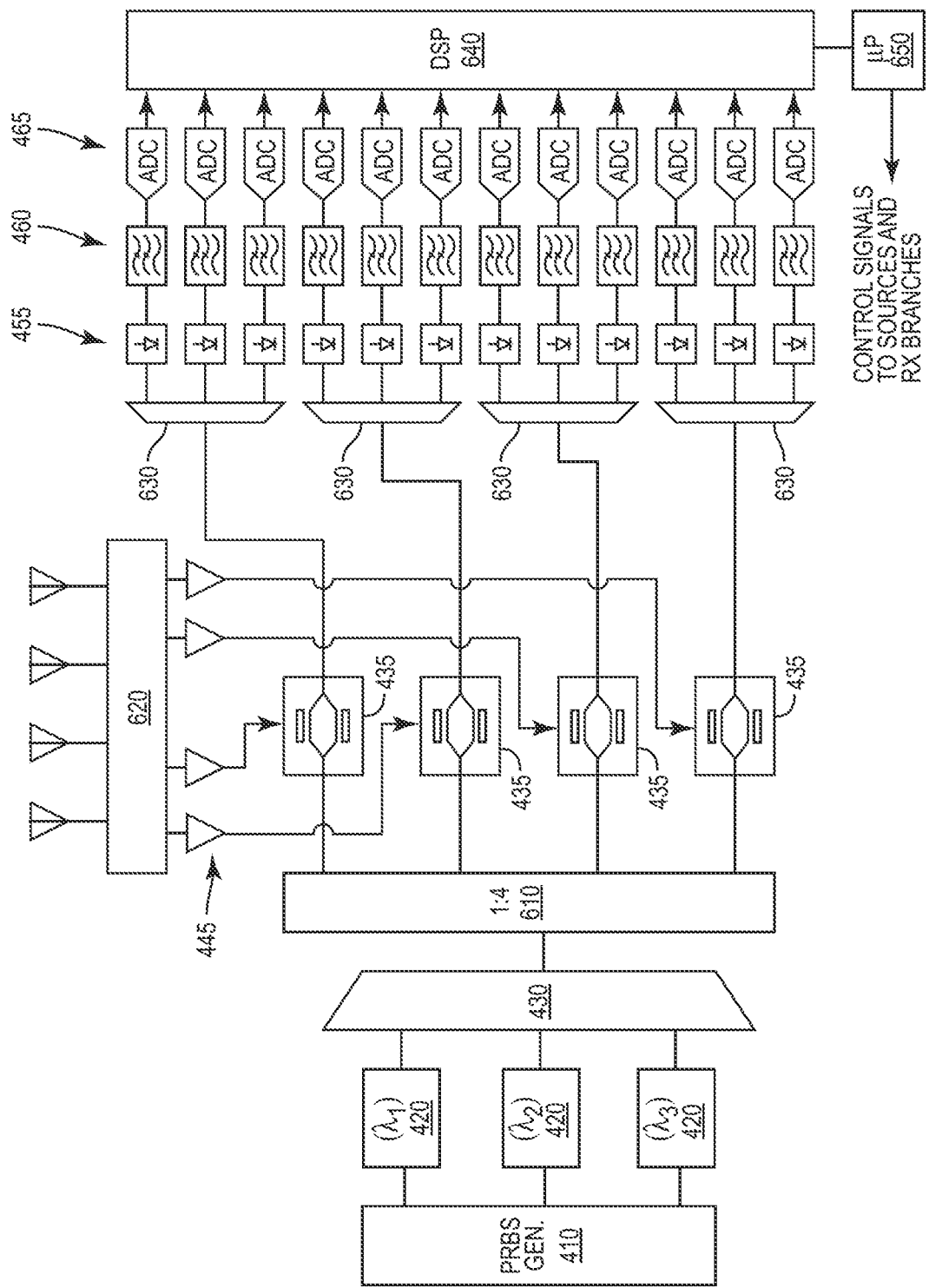
FIG. 6 is a block diagram illustrating another embodiment of the PCSR.

However, the multi-input approach illustrated in FIG. 5 can be extended to also include the parallelism provided by the architecture illustrated in FIG. 4. FIG. 6 illustrates one example of a system in which both general techniques are applied. In the system of FIG. 6, four broadband input signals are downconverted, using four parallel electro-optical modulators. Each of those electro-optical modulators is driven by a combined optical signal that includes three distinct PRBS-spread optical signals, having different center wavelengths. Each of the twelve receiver branches on the right-hand side of FIG. 6 operates on a signal corresponding to a single one of these PRBS-spread optical signals as applied to one of the broadband input signals. Of course, the illustrated system, with four parallel modulators and three PRBS-spread optical signal sources, is only one example. Other systems may have different numbers of each. Likewise, other similar systems may use spreading signals other than PRBS signals.

In more detail, then, the system illustrated in FIG. 6 includes a sampling-signal generator circuit 410, which is configured to supply a plurality of PRBS modulation signals, and several continuous-output optical sources 420 coupled to sampling-signal generator circuit 410, each having a spectrally distinct, PRBS-spread output.

The compressive receiver of FIG. 6 also includes an optical wavelength-division multiplexer 430 configured to combine the PRBS-spread source signals from the optical sources to produce a combined multi-spectral optical signals. This is followed by an optical power splitter 610, which is coupled to the optical wavelength-division multiplexer 430 and is configured to output four instances of the combined multi-wavelength optical signal, each of these having substantially the same spectral content. These four portions of the combined multi-wavelength optical signal are supplied to four optical modulators 435, each having an optical input configured to receive a corresponding one of the portions of the combined multi-wavelength optical signal and a modulation input configured to receive a corresponding broadband, sparse, multiband modulating signal. The broadband multiband modulating signals are supplied by broadband antenna front-end circuit 620, via wideband driver amplifiers 445.

Each of the outputs from modulators 435 is supplied to an optical wavelength-division demultiplexer 630, which is configured to separate the combined modulated optical signal into multiple optical output signals, each optical output signal corresponding to one of the distinct operating wavelengths of the optical sources 420. The resulting twelve optical output signals are detected by photodetector receivers 455, filtered by anti-aliasing filters 460, and converted to digital form by ADCs 465 for processing by signal processor 640. As was the case with signal processors 470 and 560, signal processing circuit 640 can detect individual signals included in the broadband signal inputs, characterize/classify the signals, and/or demodulate/decode them. Again, for example, signal processing circuit 640 may be configured (e.g., with appropriate signal processing software) to recover estimates of one or more information signal streams carried by the broadband, sparse, multiband modulating signals, using a sparse signal reconstruction algorithm.

In the system of FIG. 6, the aggregate sampling rate for ADCs 465 must be at least twice the combined occupied bandwidth for the broadband input signals. As was the case for the system in FIG. 4, the aggregate sampling rate may be dynamically adjusted in response to changes in the signals appearing in those broadband input signals. Accordingly, the system pictured in FIG. 6 further includes a control processor 650, which is configured to selectively activate/deactivate the system's receiver branches. More specifically, control processor 650 in some embodiments evaluates a frequency support structure of the broadband, sparse, multiband modulating signal, based on results from the sparse signal reconstruction algorithm, and then selectively deactivates one or more of the continuous-output optical sources or activates one or more additional continuous-output optical source, based on said evaluation. The control processor may be further configured to deactivate or activate modulation signals corresponding to the selectively deactivated or activated continuous-output optical sources, respectively. As noted earlier, high-speed PRBS generation can consume significant power resources, so the power savings from selectively deactivating unneeded PRBS generators can be substantial. Further power savings may be dynamically achieved by configuring control processor 650 to deactivate or activate an optical receiver branch corresponding to the selectively deactivated or activated continuous-output optical source, respectively.

The PCSR systems described herein combine the best aspects of prior work with important modifications to apply compressive sensing principles to a wideband photonic data conversion device with low size, weight, and power. These systems are also readily upgradeable to benefit from new generations of electronic ADC devices as they become available. The PCSR architecture provides a highly efficient mapping of a sparsely-occupied ultra-wideband spectrum of interest into the smallest possible number of electronic ADC devices.

The main performance limitations of the conventional MWC architecture described earlier are set by the performance of input mixers and pseudo-random binary sequence (PRBS) pattern modulators. However, commercial electro-optical (EO) modulators are available with 80-Gb/s ratings, which would allow 40-GHz MWC input bandwidth. Emerging MZMs are reaching 260-Gb/s rates, which would enable an MWC with about 130-GHz input bandwidth.

Electronic PRBS generators are available with chip rates of greater than 80 Gb/s, and photonic 250-Gb/s PRBS generator systems are being developed. Therefore, currently available photonic components support at least 40-GHz input bandwidths, and input bandwidths of about 125 GHz are possible using state-of-the-art photonic mixing and PRBS generators. Optically driven MZMs are also in development. Thus, the Photonic Compressive Sensing Converter architecture described below is remarkably "future-proof". The surveillance capabilities of the PCSR architecture can evolve at the rate at which photonic components improve, rather than the rate at which electronic ADCs improve.

Compressive sensing theory suggests that the collective ADC conversion rate for a compressive sensing receiver need only be 2 NB, i.e., twice the Landau information rate, where N is the number of occupied bands of maximum bandwidth B. Experiments have shown stable results with an analog electronic MWC sampling at about 1.2 times the theoretical 2 NB minimum, i.e., at 2.4 NB. The MWC architecture's ability to decouple measurement bandwidth (ADC bandwidth) from input surveillance bandwidth allows the use of higher bit-depth ADCs with lower sampling rates.

It should be appreciated that sub-Nyquist sampling is permitted by the PCSR architecture, but it is not required. As described earlier, various embodiments of the PCSR can be implemented with provision for idling of analog branches (and ADCs) to save power during periods of low occupancy, and throttling to full Nyquist-rate sampling during peak occupancy of the surveillance bandwidth. While this would not save the size or weight of the additional analog branches, it would save considerable power. The size and weight of photonic branches is minimal, using photonic integrated circuit (IC) technology.

Compressive sensing architectures are, of course, proportionally more advantageous for sparsely occupied spectrum. However, due to the distributed properties of the PCSR, any added ADC capacity is efficiently applied to the input signal environment at hand. This is in stark comparison to channelization, where fixed-frequency branches must be added in proportion to surveillance bandwidth rather than occupied {signal} bandwidth, with all channels operated continuously to assure interception.

A common Figure of Merit (FOM) used to compare ADCs of different types relates power dissipation, effective number of bits (ENOB), and effective resolution bandwidth (BW) according to: $FOM=P_{diss}/(2^{NOB} \times BW_{eff})$. However, for a proper comparison between systems, care should be taken to ensure that cited FOM figures include power dissipation of all portions of the ADC system. For fast ADCs, the inclusion of power dissipation by necessary digital I/O may increase the FOM by a factor of 2 or more. Similarly, the power dissipation of input buffering circuits and track-and-hold circuits are often omitted in FOM calculations. The total system must be considered for valid comparisons.

The best electronic ADC FOM is on the order of 0.2 pJ per conversion step (pJ/cs), but this is only possible at relatively low sample rates, e.g., about 50 MS/s. Fundamental analysis of thermal noise-dominated ADCs would suggest that power dissipation in an ADC would increase linearly with conversion rate. However, fast ADCs with high bit depth are three to four orders of magnitude above the thermal noise limit, and the relationship between power dissipation and conversion rate for practical devices does not yet follow the relation suggested by thermal noise considerations. A survey of electronic ADCs operating at higher conversion rates shows that FOM increases approximately linearly with conversion rate. Restated, power dissipation of real-world high-speed high-bit-depth electronic ADCs is observed to increase quadratically with conversion rate, rather than linearly.

The photonic Time-Stretch ADC (TS-ADC), described in detail above, is one of the best-performing photonic ADCs to date. The TS-ADC achieves reduced dissipation compared to a single Nyquist-rate electronic ADC by allowing multiple conventional electronic ADCs to perform an equivalent collective conversion in parallel at individually lower clock rates, where the FOM is better. It is noted that the hypothetical single Nyquist-rate electronic ADC could not actually be built, owing to aperture jitter and clock synchronization difficulties.

If a stretch factor of m is used in the TS-ADC, then at least m parallel ADCs are required, with some additional ADCs to provide a margin for temporal segment overlaps and for correction of distortion. As many as 2m parallel ADCs and photoreceivers (which perform differential measurements on both outputs of the MZM) may be used.

In an example implementation of a TS-ADC, a mode-locked laser (MLL) wall-plug efficiency of 20% is assumed. Using dispersion compensating fiber (DCF), the optical loss of the TS-ADC is given as (0.65m+7) dB, which gives 20 dB of optical loss for m=20. In order to provide at least 1 mW of optical signal power to each photodetector, the required laser power is therefore 20 W. A group of 2m electronic ADCs are used, each with 1-GS/s conversion at 8 ENOB and 0.5 pJ per conversion step FOM, which yields a power consumption of 125 mW per device. This gives a subtotal of 5 W for the electronic ADCs, given 2m=40 ADC devices. Each photoreceiver and voltage amplifier is assumed to dissipate 50 mW, for a subtotal of 2 W for 2m=40 photoreceivers. Dissipation by the required digital memory and I/O backplane is assumed to equal the dissipation of the converters, for an additional 5 W. The total dissipated power is therefore about 32 watts for a 20 GS/s, 8 ENOB TS-ADC, using DCF as the dispersive medium. Approximately 60% of this power is used to supply the mode-locked laser. It has been suggested, however, that chirped fiber Bragg gratings (CFBGs) may be used in place of DCF to enable a lower optical loss (and lower laser power), reducing total power dissipation to an estimated 16.5 W. Other devices can be used to implement time stretching of the optical signal, such as optical gratings and other devices that realize group velocity dispersion.

A full conversion-rate power-scaling comparison of the TS-ADC and PCSR can be made by adopting many of the same components and dissipation values. For example, the PCSR could be configured with 20 wavelength branches, and could similarly use forty 1-GHz photoreceivers and 1-GS/s, 8-ENOB ADCs, again in differential mode, measuring from both MZM outputs. However, instead of a mode-locked laser that must supply 2m branches with only 1 mW of optical power delivered to each (after 20 dB optical losses incurred in a 180 km long DCF path), the PCSR instead uses m sets of lasers, driver/modulators, and PRBS generators (or multiple taps from fewer PRBS generators). This hypothetical PCSR configuration delivers 7 mW of optical power to each branch. If only one of the two MZM output ports is digitized, the PCSR peak dissipation drops from 16.2 W down to about 10.2 W.

The PCSR per-branch dissipation will increase with the required input surveillance bandwidth, since PRBS generators and laser driver/modulators dissipate more power at higher bandwidths. However, the dissipation scaling factors for these devices are not simple functions of frequency. For example, a SiGe $2^7-1$ PRBS operating at 23 Gbps dissipates 60 mW, while a 40-Gbps device dissipates 550 mW. An 86-Gbps PRBS device dissipates 950 mW. Using a 40 Gbps PRBS with each device supplying taps for 5 processing branches, the per-branch PRBS power dissipation is 110 mW. The laser and driver conservatively use 100 mW per branch. Under these assumptions, the PCSR uses 16.2 watts with 40 active ADCs (none idled), half the power of the DCF TS-ADC for the same conversion throughput. It is therefore noted that the optical efficiency of the PCSR compares favorably to the photonic TS-ADC on a per-branch basis for full Nyquist rates, even neglecting the efficiency potential of sub-Nyquist conversion and processing rates. The TS-ADC thus continuously dissipates nearly double the peak power of the PCSR (32 W fixed versus 16.2 W peak).

Unlike the TS-ADC, the photonic compressive sensing converter can be dynamically idled for even greater power efficiency in any application where the spectral occupancy is less than full on average. The PCSR can therefore yield extremely good efficiency for applications with typical sparseness. Over extremely wide surveillance bandwidths, e.g., at 20 GHz and above, the fraction of surveillance spectrum occupied by signals of interest at a given instant does not often approach even one-half. This is particularly true at higher frequencies. A PCSR can be designed to allow idling and throttling of parallel processing branches to dynamically reduce power consumption on the fly, according to detected occupancy. Thus, the MWC can be designed to accommodate full Nyquist-rate conversion throughput, but to only use the necessary portion of that conversion throughput as occupancy warrants. For a photonic implementation of the MWC, additional analog processing branches can largely be contained on a single photonic integrated circuit. Thus, the main determinants of size and weight for additional branches are the external electronic ADC devices and connectors.

The required collective converter bandwidth is determined according to the sparseness of occupancy. The sum-total conversion rate of all the ADCs in the PCSR must be at least twice the bandwidth of occupied bands in the multiband signal model. By contrast, for a Nyquist-rate system such as an interleaved converter, the total back-end conversion rate must be at least twice the surveillance bandwidth, regardless of occupancy. If the anticipated peak spectral occupancy increases for a PCSR system, then additional ADCs (or faster individual devices) may be added (or upgraded). Unlike conventional parallelized devices and system architectures, then, the PCSR architecture can be dynamically scaled according to occupancy. Compared to conventional Nyquist-limited approaches, the PCSR will require less total ADC throughput, and lower size, weight, and power, for any scenario where the surveillance bandwidth is sparsely occupied. This will be the case for many important systems that are currently limited by ADC performance.

In light of these observations, a new system-level figure of merit is proposed for the PCSR. This new figure of merit takes into account the surveillance bandwidth (SBW) and the occupied bandwidth (OBW) for the receiver system. The new figure of merit is given as: $FOM_{PCSR}=(P_{diss} \times OBW)/(2^{ENOB} \times SBW)$. The power scaling behavior of the PCSR is most advantageous for applications where the SBW is very large and the average OBW (over time) is proportionally very small. This is precisely the situation in many applications that exploit the vastness of the electromagnetic spectrum.

While the comparison between the PCSR and TS-ADC is illustrative of the per-branch power savings, a second significant difference is found in the size and weight comparisons. The PCSR system is compatible with a high level of integration using photonic IC technology. Indeed, several components of the PCSR (lasers, modulators, WDM) have already been implemented as monolithic devices. By contrast, the mode-locked-laser, DCF fiber spools (>100 km of fiber), and differential delay network used in the continuous time version of the TS-ADC add considerable bulk to the system.

Key components in the PCSR systems described above include at least one high-bandwidth electro-optical (EO) modulator, which is used to mix the broadband input signal with the PRBS streams for each processing branch. The bandwidths of commercially available photonic modulators greatly exceed the bandwidths of the input track-and-hold circuitry for state-of-the-art ADCs.

Commercially available photonic modulators have higher bandwidths on all ports compared to electronic mixer devices. Electro-optic modulators with 80-GHz bandwidths are commercially available, and research suggests that electro-optical bandwidth will continue to improve. The PCSR architecture thus leverages the performance of commercially available photonic modulator devices, allowing for instantaneous surveillance bandwidths of 40 GHz, using current-generation 80-GHz modulators. Future photonic modulators may operate above 250 GHz.

The PCSR requires mixers characterized for broadband operation at all three ports. Conventional microwave mixers suffer from both drive and bandwidth limitations. Microwave mixers are often operated and specified with relatively narrowband operation at the local oscillator (LO) and IF ports. Mach-Zehnder electro-optic modulators (MZMs), on the other hand, are broadband on all ports. MZMs are sometimes constructed as optical waveguides on an electro-optic substrate, often lithium niobate, $LiNbO_3$. The optical input port accepts and propagates a light source, such as a single-mode continuous wave (CW) laser. This wave splits into two separate paths at an optical splitter. The wave propagates down one path unaltered. The other path passes in close proximity to a microwave waveguide (e.g., a coplanar waveguide) with high electric field strength in the optical portion. $LiNbO_3$ is electro-optic, meaning that an applied electric field varies the index of refraction and hence the velocity of propagation in the crystal. An applied microwave signal on the coplanar waveguide impresses a varying electric field on the variable branch, alternately advancing and retarding the wave's phase. The two waves recombine in the optical combiner and exit the modulator. Sufficient phase changes alternately cancel and reinforce the optical signal. Feeding the coplanar guide with a modulating signal impresses that signal on the optical output; therefore the device is a highly linear, very wideband modulator.

Wavelength-division multiplexers (WDMs) and compatible laser sources for dense analog parallel processing WDMs are typically used to increase fiber data capacity by sending multiple optical carriers of differing wavelengths down a single fiber. As the optical carriers are at differing wavelengths with adequate channel spacing, they do not interfere with each other. A second WDM de-multiplexes the optical content back out to individual wavelengths. The PCSR system uses wavelength-division multiplexers (WDMs) to parallelize analog front-end processing in the optical domain. Multiple laser wavelengths, each patterned with a unique PRBS, are combined via wavelength-division multiplexing, mixed with the broadband signal input, and de-multiplexed with a second WDM before photodetection and low-pass filtering.

Laser diodes, including but not limited to Fabry-Perot and distributed feedback (DFB) types, are common in high-speed communications applications. Communication lasers can be directly intensity-modulated by a driver, or operated in CW mode and modulated via an external Electro-Absorption Modulators (EAM), Ring Resonator Modulator (RRM), or MZM. Direct modulation introduces a small signal-dependent frequency shift in the laser's output (known as "chirp"). Chirp limits the possible distance (reach) of fiber-optic links due to dispersion (the frequency-dependent change in fiber core index of refraction which causes propagation velocity to vary with frequency. Indirect modulation with an external modulator combats this problem and greatly extends the possible range by many tens of kilometers.

In the PCSR architecture, however, no long distances are used. Therefore, the high-speed PRBS signal can either directly modulate a laser or other optical source, such as a light-emitting diode, or indirectly modulate the optical source via an EAM, RRM, or MZM. Direct modulation is cheaper and consumes less power, but it will add some noise to the conversion process by adding a form of PRBS jitter that will increase in frequency and will impose a resolution and noise limit at the high frequency end. Calculations and simulation can be used to quantify the effects of modulation non-ideality.

Arrays of tunable narrowband distributed feedback (DFB) lasers have been built into highly-integrated Photonic Integrated Circuits (PICs), along with monolithic EAMs and WDMs. For example, a 40-channel by 40-Gbps device (1.6-Tbps throughput) has been demonstrated for carrying data over single mode fibers over distances of tens of kilometers. Due to the short propagation distances involved in the PCSR, requirements for both optical power and spectral purity are much lower. Therefore, some embodiments of the PCSR may use power-efficient laser sources and integrated modulators similar to those being developed currently for Very Short Reach (VSR) and Ultra Short Reach (USR) optical interconnects, which are currently being developed to connect servers and components on a single board at low power and high bit density.

In the PCSR, the Nyquist theorem manifests itself as a set of frequency-domain requirements on the high-rate PRBS pattern generators. The PRBS bit rate in each branch must be twice the surveillance rate, as the PRBS transition rate must be fast enough to adequately sample the entire surveillance bandwidth and to alias the samples to baseband. Jitter in the PRBS waveform effectively adds noise to the sampling process, raising the noise floor and reducing dynamic range. Random jitter and deterministic jitter affect the system differently, as deterministic jitter may be calibrated out as long as the periodicity requirement is met.

Due to the frequency-domain operation of the PCSR, jitter in the PRBS patterns affects conversion accuracy differently than jitter in a standard time-domain ADC sampling clock. Additionally, PRBS jitter affects PCSR measurement differently than in standard non-uniform sampling, which may also use a PRBS pattern but which requires highly ideal time-domain behavior. The PCSR requires periodicity of the PRBS waveforms and stability of the low-pass filter response, which can both be considered frequency-domain properties. The sensing matrix will remain constant according to these frequency-domain properties, regardless of non-ideality in the time-domain appearance of the PRBS pattern waveforms.

The PRBS signal generator must provide a number of sufficiently uncorrelated taps equal to the number of receiver channels. Access to multiple taps is atypical in communications-grade PRBS instruments. Multiple PRBS generators may be used, or conventional high-rate PRBS generators may be modified to provide multiple taps that are sufficiently uncorrelated.

Photodiode amplifiers for use as photodetector receivers are mature, widely available components. High-sensitivity, low-noise photodiodes feed transimpedance amplifiers, which convert the diode photocurrent into a voltage.

Many different compressive sensing algorithms can be implemented in the DSP backend of the PCSR. Algorithm development is a current subject of research by many independent teams. A system simulator of sufficient fidelity can be used to generate test data for verification and comparison of different compressive sensing algorithms to evaluate and compare different approaches as they emerge.

The signal processing circuits and controller circuits discussed above may be provided through the use of dedicated hardware, specialized digital processor devices programmed in firmware or with software, or conventional microprocessors or microcontrollers in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

What is claimed is:

1. A compressive sensing receiver, comprising:
a sampling-signal generator circuit configured to supply a plurality of modulation signals, wherein each modulation signal is a periodic spreading-signal;
two or more continuous-output optical sources having distinct spectral outputs and configured to produce spread source signals, each optical source having a modulation input coupled to a corresponding one of the modulation signals;
an optical wavelength-division multiplexer configured to combine the spread source signals from the optical sources to produce a combined multi-spectral optical signal;
a first optical modulator having an optical input configured to receive at least a first portion of the combined multi-spectral optical signal, a first modulation input configured to receive a first broadband, sparse, multi-band input, and a first modulator output configured to output a first modulated optical signal;
an optical wavelength-division demultiplexer configured to separate the first modulated optical signal into a plurality of optical output signals, each optical output signal corresponding to one of the distinct operating wavelengths of the continuous-output optical sources;
two or more optical receiver branches corresponding to the two or more continuous-output optical sources, wherein each optical receiver branch is coupled to one of the optical output signals from the optical wavelength-division demultiplexer and comprises a photodetector receiver followed by an analog-to-digital converter; and
a signal processing circuit configured to receive digital output signals from the analog-to-digital converters and to detect individual signals received by the broadband front-end system, or characterize signals received by the broadband front-end, or demodulate signals received by the broadband front-end, or perform a combination of said detecting, characterizing, and demodulating.

2. The compressive sensing receiver of claim 1, wherein each modulation signal is a pseudorandom binary sequence (PRBS).

3. The compressive sensing receiver of claim 1, wherein said signal processing circuit is configured to recover estimates of one or more information signal streams carried by the broadband, sparse, multiband modulating signal, using a sparse signal reconstruction algorithm.

4. The compressive sensing receiver of claim 1, wherein at least one of the continuous-output optical sources comprises a continuous-output laser with its output coupled to an electro-optical modulator.

5. The compressive sensing receiver of claim 4, wherein the electro-optical modulator is selected from a group consisting of: a Mach-Zehnder modulator; a ring resonator modulator; and an electro-absorption modulator.

6. The compressive sensing receiver of claim 1, wherein the modulation input for at least one of the continuous-output optical sources is coupled to a biasing input of a directly-modulatable continuous-output laser.

7. The compressive sensing receiver of claim 1, further comprising a control processor configured to:
evaluate a frequency support structure of the broadband, sparse, multiband modulating signal, based on results from the sparse signal reconstruction algorithm; and
selectively deactivate one or more of the continuous-output optical sources or activate one or more additional continuous-output optical source, based on said evaluation.

8. The compressive sensing receiver of claim 7, wherein the control processor is further configured to deactivate or activate modulation signals corresponding to the selectively deactivated or activated continuous-output optical sources, respectively.

9. The compressive sensing receiver of claim 7, wherein the control processor is further configured to deactivate or activate an optical receiver branch corresponding to the selectively deactivated or activated continuous-output optical source, respectively.

10. A compressive sensing receiver, comprising:
a sampling-signal generator circuit configured to supply a modulation signal, wherein the modulation signal is a periodic spreading signal;
a continuous-output optical source configured to produce a spread source signal, the optical source having a modulation input coupled to the modulation signal;
an optical modulator having an optical input configured to receive the optical signal, a modulation input configured to receive a broadband, sparse, multiband input, and a modulator output configured to output a modulated optical signal;
an optical receiver coupled to the optical modulator to receive the modulated optical signal and comprising a photodetector receiver followed by an analog-to-digital converter; and
a signal processing circuit configured to receive digital output signals from the analog-to-digital converter and to detect individual signals received by the broadband front-end system, or characterize signals received by the broadband front-end, or demodulate signals received by the broadband front-end, or perform a combination of said detecting, characterizing, and demodulating.

* * * * *